US005867653A

United States Patent [19]
Aras et al.

[11] Patent Number: 5,867,653
[45] Date of Patent: Feb. 2, 1999

[54] METHOD AND APPARATUS FOR MULTI-CAST BASED VIDEO CONFERENCING

[75] Inventors: Caglan M. Aras, Raleigh, N.C.; Roch A. Guerin, Yorktown Heights, N.Y.; Gerald Lebizay, Vence, France; Raif O. Onvural, Cary, N.C.; Gary Roy Shippy, Cary, N.C.; Ling-Ching Wang Tai, Cary, N.C.

[73] Assignee: International Business Machines Corporation, Armonk, N.Y.

[21] Appl. No.: 633,261

[22] Filed: Apr. 18, 1996

[51] Int. Cl.[6] .................................................. H01N 13/00
[52] U.S. Cl. .............................. 395/200.34; 395/200.35; 395/200.36; 370/260; 370/261; 370/264; 370/265; 370/270; 379/93.04; 379/93.21
[58] Field of Search ........................ 395/200.35, 200.34, 395/200.36; 370/260, 261, 264, 265, 270; 379/93.04, 93.21

[56] References Cited

U.S. PATENT DOCUMENTS

| | | | |
|---|---|---|---|
| 5,003,532 | 3/1991 | Ashida et al. | 348/15 |
| 5,179,551 | 1/1993 | Turner | 370/60 |
| 5,227,875 | 7/1993 | Suu et al. | 358/133 |
| 5,257,306 | 10/1993 | Watanabe | 348/15 |
| 5,305,311 | 4/1994 | Lyles | 370/60 |
| 5,309,433 | 5/1994 | Cidon et al. | 370/60 |
| 5,325,356 | 6/1994 | Lyles | 370/60 |
| 5,345,558 | 9/1994 | Opher et al. | 395/200 |
| 5,402,415 | 3/1995 | Turner | 370/60 |
| 5,408,465 | 4/1995 | Gusella et al. | 370/17 |
| 5,440,549 | 8/1995 | Min et al. | 370/60 |
| 5,473,367 | 12/1995 | Bales et al. | 348/16 |
| 5,491,508 | 2/1996 | Friedell et al. | 348/16 |

OTHER PUBLICATIONS

Oikarinen et al., "Internet Relay Chat Protocol", RFC 1459, http://www.irchelp.org/irchelp/rfc 1459.html, May 1993.
Bagwell et al., "Achieving IP–Multicast Functionality in the Asynchronous Transfer Mode Environment", Southeastern, 1995 IEEE Conference Proceedings, 1995.
CWSApps—16–bit IRC Apps, http://cws.internet.com/16irc.html, Apr. 14, 1998.
IBM Technical Report TR29.2048, Aug. 1995, "Multicast in an IP and ATM Environment", A. M. Gallo.

*Primary Examiner*—Frank J. Asta
*Assistant Examiner*—Daniel Patru
*Attorney, Agent, or Firm*—John D. Flynn; Winstead, Sechrest & Minick, PC

[57] ABSTRACT

A distance learning system consists of a plurality of multi-cast clients of various classes and priorities with one multi-cast client as a primary multi-cast client, a multi-cast server, arbitrator and a distance learning session coordinator. The primary multi-cast client provides the default or primary Audio-Visual Material (AVM) stream. The Multi-Cast Server (MCS) setups a multi-cast over a point to multi-point connection which connects all multi-cast clients that are to take part in a particular distance learning session, along with the Primary multi-cast client. Additionally, the primary multi-cast client is connected to the MCS via a point-to-point link. The multi-cast clients and the primary multi-cast client receive an AVM material stream from the multi-cast server via the point to multi-point connection. When a multi-cast client wishes to speak, a speaking request is sent to the arbitrator, the arbitrator determines whether to grant or deny the speaking request. If permission is granted then a point-to-point link is established between the requesting multi-cast client and the MCS. The requesting multi-cast client then provides an AVM stream to the multi-cast server over the newly established point-to-point connection and the multi-cast server switches or provides the AVM stream associated with the requesting multi-cast Client over the point to multi-point connection. When the requesting multi-cast client is through speaking the MCS switches the AVM stream associated with the primary multi-cast client onto the point to multi-point connection and the point-to-point link with the requesting multi-cast client is terminated.

24 Claims, 12 Drawing Sheets

METHOD AND APPARATUS FOR MULTI-CAST BASED VIDEO CONFERENCING

BACKGROUND OF THE INVENTION

RELATED APPLICATIONS

The present invention relates to "A MULTI-CAST SERVER" Ser. No.: 08/634,453 IBM docket no.: RA9-96-026 filed Apr. 18, 1996 assigned to the same assignee as the present invention, herein incorporated by reference.

1. Field of the Invention

The present invention relates to a method and apparatus for video conferencing applications such as distance learning. More particularly, it relates to a method and apparatus involving the use of multi-point data transmission for multi-party video conferencing.

2. Description of the Prior Art

Video conferencing promises to bring people in far-flung communities together through communication networks. Distance learning expands video conferencing usage by allowing students in small communities to attend courses taught by experts, without having to travel to major educational institutions.

Prior art distance learning systems consisted of classrooms equipped with video cameras, large screen video monitors, local video and audio mixing facilities, and a means to transmit video and audio information between these sites. During a distance learning session, one such classroom is designated as the teacher site; other sites participate in the distance learning session as student classrooms. Early distance learning systems employed analog video equipment, and recently digitally encoded video, which is carried over dedicated data links. A typical arrangement includes: point-of-presence video codecs, a multi-conference control unit (MCU) that switches video between different sources, and dedicated point-to-point data links connecting the point-of-presence codecs with the MCU. A distributed conference-control application manages the class schedules and source switching.

There are several drawbacks of MCU based distance learning system configurations that stem from the star-topology and dedicated links of the system. The first drawback is dedicated transmission: all video streams must be transmitted to the MCU before they reach participants in a video conferencing or distance learning session. This means that bandwidth must be dedicated for all participants to transmit their audiovisual stream, even if they are not being viewed by other participants. Since all incoming and outgoing video data is transmitted on point-to-point links, bandwidth is wasted in the network that could otherwise be used for non-video data transmissions. The second drawback is that of centralized resource bottleneck. A traditional MCU video source switching can become a bottleneck in the system, especially when there are concurrent distance learning sessions. The third drawback is that expansion of the monolithic multi-conferencing unit is difficult. The complexity of the MCU increases with each distant site that is added. A traditional MCU serves all video conference sessions in a particular network. Since the capacity of the MCU is fixed, as the network expands, the MCU has to be expanded to accommodate the increased number of users. An MCU has limitations on the total number of ports that can be served at one time. As a result, a major increase in capacity requires replacement of the MCU.

These unresolved problems and deficiencies are clearly felt in the art and are solved by the invention in the manner described below.

SUMMARY OF THE INVENTION

The above-mentioned needs have been met in accordance with the present invention by providing a system which contains a plurality of multi-cast clients of various classes and priorities with one multi-cast client as a primary multi-cast client, a multi-cast server, arbitrator and a coordinator. The primary multi-cast client provides the default or primary Audio-Visual Material (AVM) stream. The Multi-Cast Server (MCS) sets up a point to multi-point connection connecting all multi-cast clients that are to take part in a particular session, along with the Primary multi-cast client. Additionally, the primary multi-cast client is connected to the MCS via a point-to-point link. The multi-cast clients and the primary multi-cast client receive an AVM stream from the multi-cast server via the point to multi-point connection. When a multi-cast client wishes to speak, a speaking request is sent to the arbitrator, the arbitrator determines whether to grant or deny the speaking request. If permission is granted then a point-to-point link is established between the requesting multi-cast client and the MCS. The requesting multi-cast client then provides an AVM stream to the multi-cast server over the newly established point-to-point connection and the multi-cast server switches, or provides the AVM stream associated with the requesting multi-cast client over the point to multi-point connection. Thus, the requesting multi-cast clients associated AVM stream is multi-cast over the point to multi-point connection. When the requesting multi-cast client is through speaking the MCS switches the AVM stream associated with the primary multi-cast client onto the point to multi-point connection and the point-to-point link with the requesting multi-cast client is terminated.

It is an object of the invention to provide efficient bandwidth utilization of a communications network.

It is yet another object of the invention to provide a server platform capable of supporting multiple video conferencing sessions such as distance learning sessions.

It is an object of the invention to provide a low cost multi-party video conferencing system for applications such as distance learning.

It is an object of the invention to provide a multi-party video conferencing system that is capable of providing large scale operation on a large scale network.

It is another object of the invention to provide a distance learning system that is scalable.

It is another object of the invention to take advantage of multi-cast capabilities of a communications network providing such features.

BRIEF DESCRIPTION OF THE DRAWINGS

The foregoing and other objects, aspects and advantages of the invention will be better understood from the following detailed description with reference to the drawings, in which.

DETAILED DESCRIPTION

Figure 1:
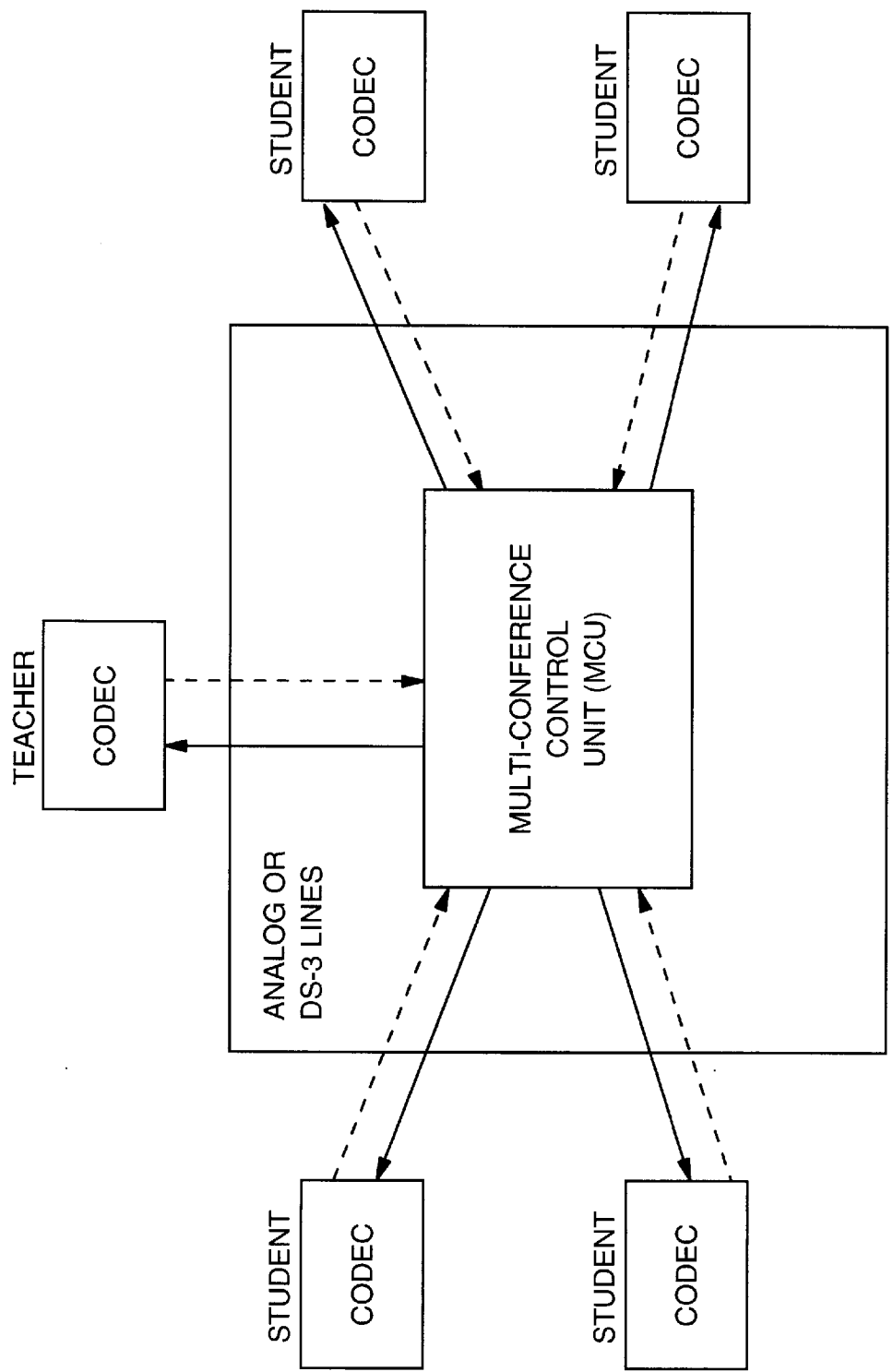
FIG. 1 depicts a prior art system.
Figure 2:
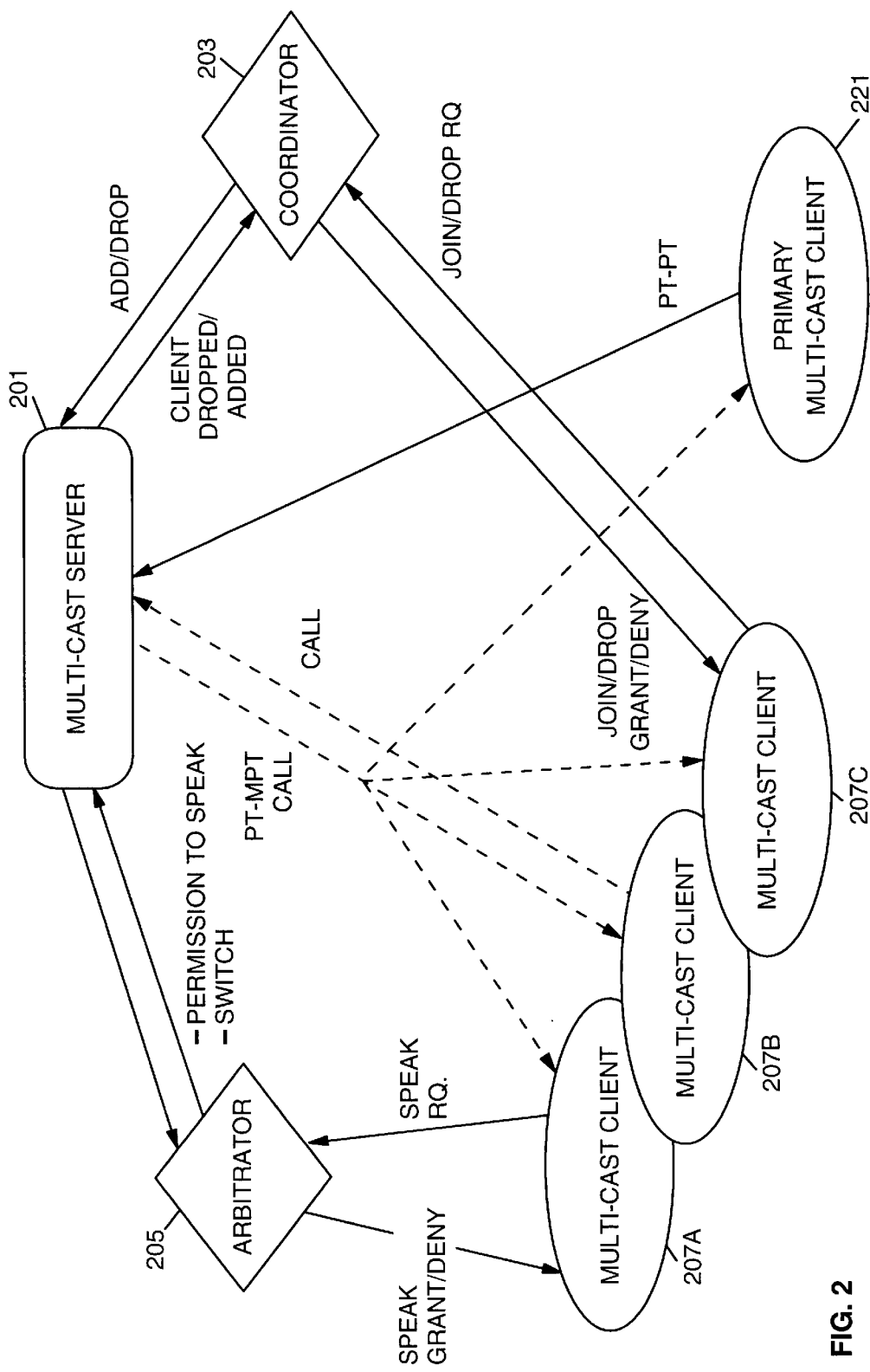
FIG. 2 depicts a functional overview of a distance learning system based on multi-party video conferencing.

As depicted in FIG. 2, a distance learning system consists of a plurality of multi-cast clients 207A, 207B, 207C of various classes and priorities, a multi-cast server 201, arbitrator 205 and a distance learning session coordinator 203. These are the logical components of a distance learning system. Logical components may implemented in software and/or hardware and may be distributed throughout the distance learning system or combined with other components.

An overview of these components and their relationships are shown in FIG. 2. One MC client is a primary MC client 221. The primary MC client 221 provides the default or primary Audio-Visual Material (AVM) stream. An AVM stream is audio and video information. In a distance learning system, the AVM stream may be digitized and/or compressed video and audio in any format suitable for transmission over a communications network. The AVM stream may be analog and/or digital format and may be obtained from a camcorder, video camera, Codec, or other audio video device. In the preferred embodiment the communications network is an ATM network and the AVM stream is embedded in packets or cells. The packets may contain uncompressed digital information or compressed information formed from a compression algorithm such as MPEG-2 or JPEG. Each multi-cast client receives the multi-cast AVM stream and presents the AVM stream to students at the MC client site. The primary MC client 221 will usually be associated with the instructor or teacher of a particular distance learning session. The Multi-Cast Server (MCS) 201 sets up a point to multi-point connection over a digital network connecting all MC clients 207A, 207B, 207C that are to take part in a particular distance learning session along with the Primary MC client 221. The primary MC client 221 is also part of the point to multi-point connection. This allows the primary MC client 221 to receive the same AVM stream as other clients. Additionally, the primary MC client 221 is connected to the MCS 201 via a point-to-point link. The Primary MC Client 221 provides the MCS 201 with an AVM stream which the MCS multi-casts over the point to multi-point connection.

The multi-cast clients 207A, 207B, 207C and the primary MC Client 221 receive an AVM stream from the multi-cast server via the multi-cast. The multi-cast is a point-to-multi-point connection established in the communications network that provides for the efficient use of the communications network's bandwidth. When a multi-cast client wishes to speak, a speaking request is sent to the arbitrator 205, the arbitrator determines whether to grant or deny the speaking request. If permission is granted then a point-to-point link is established between the requesting MC client and the MCS. The requesting MC client then provides an AVM stream to the MC server 201 over the newly established point-to-point connection and the MC server 201 switches or selects the AVM stream associated with the requesting MC Client for multi-casting. Thus, the requesting MC client's associated AVM stream is multi-cast over the point to multi-point connection. This is termed "virtual circuit re-routing". When the requesting MC client is through speaking, or permission to speak is otherwise terminated, the MCS 201 switches or selects the AVM stream associated with the Primary MC client onto the point to multi-point connection and the point-to-point link with the requesting MC client is terminated.

The distance learning system may make use of a coordinator 203 that the MC clients utilize to join a particular distance learning session or to drop out of a particular distance learning session. The coordinator grants or denies the join/drop requests and informs the MCS as required. The coordinator function may also handle participant billing and other administrative functions associated with a distance learning system. The MCS may then modify the point to multi-point connection established for the particular distance learning session accordingly. The coordinator function may be collocated with the MCS. Each of the distance learning components is described in detail below.

The present invention utilizes a multi-cast (the action of transmitting the same data to more than one recipient simultaneously) to decrease total bandwidth consumed in a multi-party video conference, such as in distance learning. A multi-cast can be implemented in many ways. In communication networks, one means of implementing a multi-cast is through a point-to-multi-point connection. If the network is sparsely connected and if efficient routing algorithms are used, a minimum spanning tree can be formed to efficiently multi-cast data over network. In other networks, such efficiencies may or may not be possible or may not be required for a multi-cast. The preferred implementation of this invention is on networks that do provide point to multi-point connections that utilize less bandwidth than N point to point connections. The network should provide some form of multi-casting. To clarify the terminology, the term "multi-cast" is used as a verb to describe the action of multi-casting. The term "point to multi-point connection" describes any form of multi-cast, without restricting it to any topology or networking technology including LANs (Ethernet, token ring, FDDI and others) satellite, ATM, frame relay, SMDS or other networks.

It should be understood that the present invention contains one or more software systems or software components. In this context, a software system is a collection of one or more executable software programs, and one or more storage areas (for example, RAM, ROM, cache, disk, flash memory, PCMCIA, CD-ROM, Server's Memory, ftp accessible memory, etc.) In general terms, a software system should be understood to comprise a fully functional software embodiment of a function or collection of functions, which can be added to an existing computer system to provide new function to that computer system. Software systems generally are constructed in a layered fashion. In a layered system, a lowest level software system is usually the computer operating system which enables the hardware to execute software instructions. Additional layers of software systems may provide, for example, database or graphical user interface or window management system capabilities. These software systems provide a foundation on which additional software systems can be built.

A software system is thus understood to be a software implementation of a function which can be assembled in a computer system providing new functionality. Also, in general, the interface provided by one software system to another software system is well-defined. It should be understood in the context of the present invention that delineations between software systems are representative of the preferred implementation. However, the present invention may be implemented using any combination or separation of software or hardware systems.

The software system may be distributed on a computer usable medium such as floppy disk, diskettes, CD-ROM, PCMCIA cards, flash memory cards and/or any other computer usable medium. Note that the software system may also be downloaded to a workstation via a communications network or from an Internet node accessible via the communications adapter.

Multi-cast Client

The multi-cast clients are the source of data to be multi-cast to all other participants of a multi-cast based distance learning session. The data sent by the MC clients, and to the MC clients, is referred to as a AVM stream. The AVM video portion may be presented to the students on a PC screen, picture tube, projection device, TV screen, monitor or any other display device. The audio portion, is presented to the students using speakers. Each MC Client is capable of receiving an AVM stream and processing the stream so that it may be presented. Each multi-cast client supports the following capabilities: request permission to speak, transmit an AVM stream, receive an AVM stream, and Joining and Dropping from a distance learning session. These function are described in more detail herein.

Request permission to speak

The MC Client sends a signal or message to the arbitrator that indicates a request to speak in the distance learning session. In distance learning, speak means a student wishes to ask a question or make a comment that should be heard and/or seen by the teacher and all other students. The student's video and audio should be presented to all participants when a student granted permission to speak speaks.

Transmit or Speak

The MC Client, after being granted permission to speak, establishes a point to point connection to the multi-cast server. In an alternative embodiment the MC server establishes the connection. In distance learning, the MC client transmits the student AVM stream (i.e., audio and video data) associated with the MC client to the multi-cast server, to be multi-cast to all other MC clients participating in the distance learning session. Thus, all participants are provided with the requesting MC clients AVM stream. The AVM stream may present the student asking a question or may present an AVM source such as what the student is viewing on a workstation or screen. When the MC client is through speaking or is preempted by another MC client or the permission to speak is otherwise terminated the point-to-point link is disconnected.

Join/Drop

The client sends a signal or message to the session coordinator to join a particular distance session. Join and drops may be initiated by the coordinator, and with permission, may also be initiated by the clients.

There are several multi-cast client classes. Primary clients (typically, the instructor or teacher of a distance learning session) are considered to be the default source of an AVM stream for a multi-cast distance learning session. Thus, the primary MC's associated AVM stream (i.e., the instructor) is presented to other MC clients (i.e., the students) when no other client is selected as the active source. Primary clients can be connected to the MC server via a point-to-point link or collocated with the MCS. Unlike an MC client granted permission to speak, the Primary MC's point-to-point link is not terminated or disconnected when the associated AVM stream is not selected for multi-casting by the MCS. Thus, the distance learning session will always have a default AVM stream to multi-cast in case one of the requesting clients links to the MC server is terminated. Another benefit of maintaining an MCS dedicated or static link to the primary MC is switching time and network considerations. Thus, there are at least two benefits of not disconnecting the circuit between the primary MC client and the MC server: preventing excessive switching and elimination of circuit setup delay. Preventing Excessive switching: In most usage scenarios, the AVM stream of the primary client may be interleaved in time with the AVMs of other clients. If the circuit carrying the primary client AVM stream is dropped, at each view change, not one but two circuits (the primary client and the new client wishing to speak) will have to be setup during each view change. Keeping the circuit of the primary client active at all times halves the total number of circuits that need to be set up. The elimination of circuit setup delay: Each time a circuit is setup, there is a setup delay. This delay varies with the instantaneous utilization of the network. On a highly utilized network, circuit setup may take longer than acceptable to the application. Since the view of the primary client appears after a client completes its session, it is preferable to show the view of the primary client without any noticeable delay. Keeping the circuit between the primary client and the MC server eliminates the circuit setup delay and allows instantaneous switching from a regular client to the primary client.

All non-primary clients are regular clients whose calls are disconnected when the client is through speaking. All clients, except the primary client, must request permission to speak in order for their associated AVM stream to be presented to other clients. In certain cases, the image or video or AVM stream of the primary client may be overlaid, or inserted as a picture-in-picture within the image or video or AVM stream of the active client.

Multi-cast Server

The multi-cast server sets up a point to-multi-point connection for multi-casting the selected AVM stream to participants of the distance learning session. The source of the selected AVM stream that is multi-cast will change over the course of the session. The multi-cast server's primary function is the routing of the AVM streams from different, dynamically activated, point-to-point connections, into a static (for the duration of the distance learning session) point-to-multi-point link. The multi-cast server supports the following functions:

Setup/Tear-down of point to multi-point connections

The multi-cast server sets up a point-to-multi-point link originating from the multi-cast server to a list of participants of the distance learning session.

Add/Drop

The multi-cast server can add or drop a participant at any time, under external command. The multi-cast server also notifies an external session coordinator of any multi-cast clients that may have dropped due to network failures.

Accept data connections from clients

A multi-cast client that has been granted permission to speak will call the multi-cast server to initiate the transfer of its associated AVM stream to be multi-cast over the distance learning session point to multi-point connection. The multi-cast server accepts the data connection, after receiving an acknowledgment from the arbitrator. Note in an alternative embodiment the MCS may initiate the call to establish the point-to-point connection.

Switch multi-cast sources

The Multi-cast server selects the source of the AVM stream multi-cast over the point to multi-point connection associated with a particular distance learning session. The multi-cast server switches the AVM stream source that is fed into the point to multi-point connection amongst the several data connections active at the time of switching. Some component in the distance learning system must determine which data connection (i.e., AVM stream) will be the next point to multi-point connection source. In the preferred embodiment this is the arbitrator. The multi-cast server notifies the switched out multi-cast client that it can disconnect its call to the multi-cast server. Primary clients need not disconnect their calls to the multi-cast server.

Arbitrator

The arbitrator is responsible for determining the source of the AVM stream that is multi-cast over the point to multi-point connection. The arbitrator receives requests for permission to speak in a particular distance learning session from MC clients. The arbitrator grants or denies these requests depending on the state of the session. The arbitrator may be totally automated or may require approval from a human session coordinator such as a teacher or instructor or session coordinator. The arbitrator provides the following functions:

Accepts requests for permission to speak

Receives signals or messages from multi-cast clients which indicate a request for permission to speak.

Grants or denies requests

Sends signals or a message back to multi-cast clients that indicate a grant or denial of the request for permission to speak.

Notifies Multi-cast Server

The arbitrator notifies the multi-cast server of permissions granted to multi-cast clients so that appropriate action can be taken.

The arbitrator function can implement several arbitration schemes. Each distance learning session could utilize one or more arbitration schemes. Several candidate arbitration schemes include:

1) First Request First Speak: All requests to speak are ordered in a queue. Any ties are resolved by a random selection.
2) First Request First Speak with Time out or Cancellation: All requests to speak are ordered in a queue. Any ties are resolved by a random selection. Any speaker may cancel their request by some established means. In the case of very long wait queues, requests that had been made before a certain time may be timed out.
3) First Request First Speak with Interrupt: All requests to speak are ordered in a queue. After a certain time, termed base time, any new speak requests will interrupt the current speaker. All interrupt requests will queue in first come first serve fashion.
4) Manual: All requests will be presented to the operator of the application. The human operator will use his/her judgment to determine who shall speak next. The operator may also determine when to switch back to the primary client. All requests made to the operator will be presented at the time of the request. The operator will be able to view all requests simultaneously.

Coordinator

The coordinator manages the participant (i.e., MC client) joins and drops into a particular distance learning session, including the handling of permissions of participants to join a particular distance learning session. The coordinator may also have the MCS establish a point-to-point connection with the primary MC client. The coordinator may provide the MC server with a list of participants that are to be connected via the point to multi-point connection for a particular distance learning session. The coordinator may also initiate sessions. The functions supported by the coordinator include:

Join/Drop Request Handling

The coordinator handles requests to join or drop out of a distance learning session.

Session initiation/termination

Receives a list of session participants from a user application and commands the multi-cast server to initiate and terminate sessions.

Communication Network

The preferred embodiment of present invention utilizes a communication network that provides a dynamic circuit setup and a point to-multi point connection setup. The network should be able to setup a circuit between a client and the MCS upon request. The setup time should be less than one second. The network should be able to setup a circuit that originates from one client station and that can terminate in multiple receiving client stations. The network should be able to selectively add or delete parties into this multi-point call. An Asynchronous Transfer Mode (ATM) Network with Switched Virtual Circuit (SVC) and multipoint signaling is an example of a network that will satisfy these requirements.

ATM COMMUNICATIONS NETWORK ENVIRONMENT

Asynchronous Transfer Mode (ATM) communication networks combine data, voice and video into the same communication infrastructure for lower cost and higher reliability. ATM is specifically suitable to providing AVM streams because of its high bandwidth and quality of service guarantees. It also offers the ability to multi-cast data originating from a single source. Since distance learning is predominantly a one-way transmission of video and audio from the teacher site to all student classrooms, distance learning applications stand to immediately benefit from ATM.

Even with multi-cast capabilities, standard ATM features accessible through the ATM User-to-Network Interface (UNI) 3.1 are not sufficient to implement distance learning applications. When limited to multi-cast, it is only possible to define a point to multi-point connection from the teacher site to all student sites. Thus, only the teacher's view may be transmitted to student sites. For a session where students only listen to the lecture, this may be a sufficient solution. However, true distance learning allows students' views to appear on monitors in other classrooms when asking a question. This requires the transmission of the AVM stream from a student site to all other student sites. When confined to standard ATM multi-cast facilities (i.e., UNI 3.1 & 4.0), this may be accomplished in one of two ways. The first way is to set up one point to multi-point connection per student that originates from each student site and that reaches to all participants in the session. Assuming N students, this requires N point to multi-point connections with bandwidth reserved for each. It also requires each student site to switch between a teacher AVM stream and a speaking student AVM stream. A second method is to dynamically setup a point to multi-point connection from student sites whenever the student asks a question. This saves bandwidth but, requires very fast connection setup times that are very difficult to achieve in large networks. Neither of these solutions are acceptable for distance learning implementations on large networks or on systems that perform multiple distance learning sessions concurrently.

The present invention is now described with respect to a multi-cast based distance learning system embodying a plurality of multi-cast clients, multi-cast server, arbitrator and coordinator logical components that takes advantage of ATM multi-cast capabilities.

Figure 3:
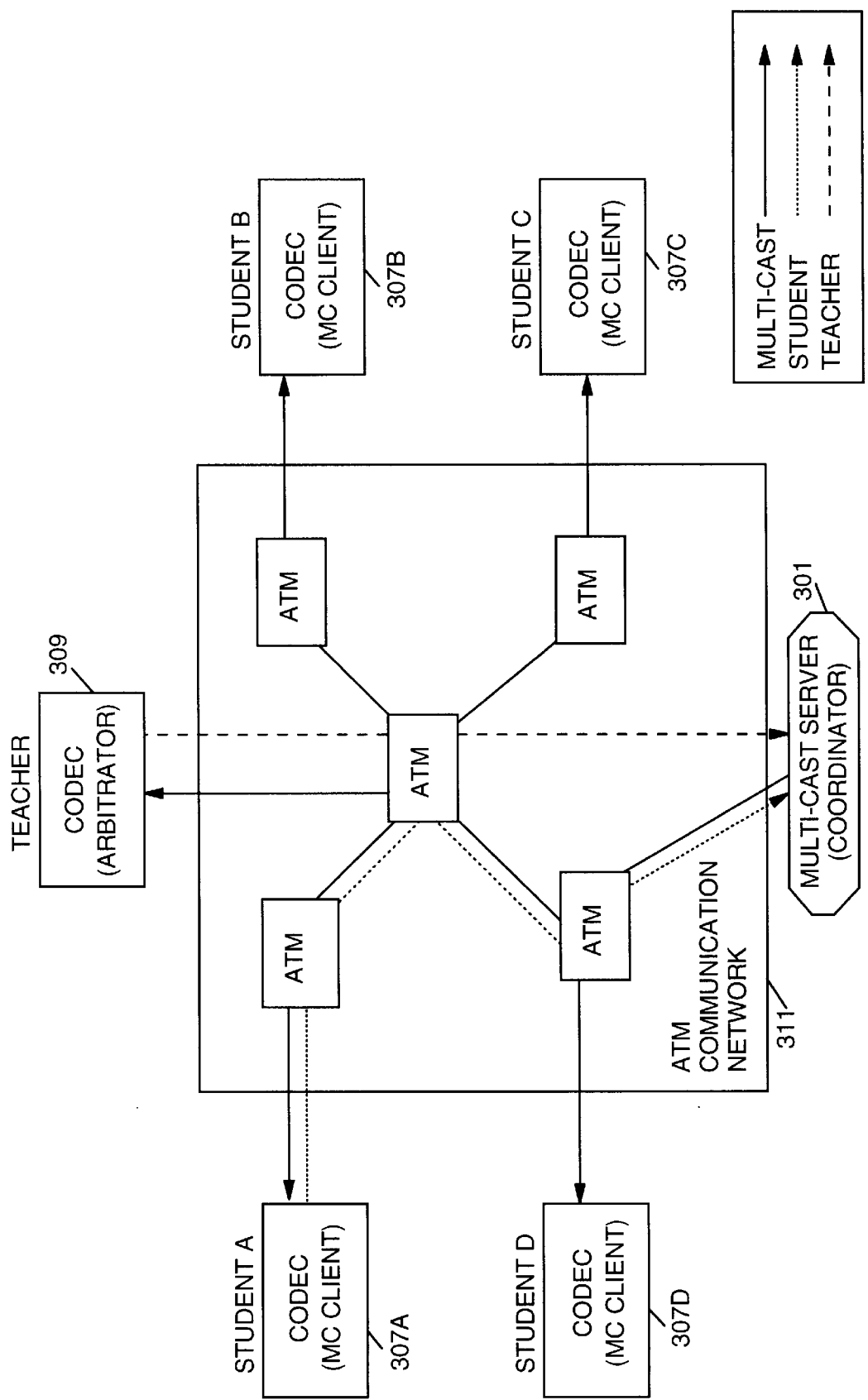
FIG. 3 depicts a distance learning system with ATM switches.
Figure 4:
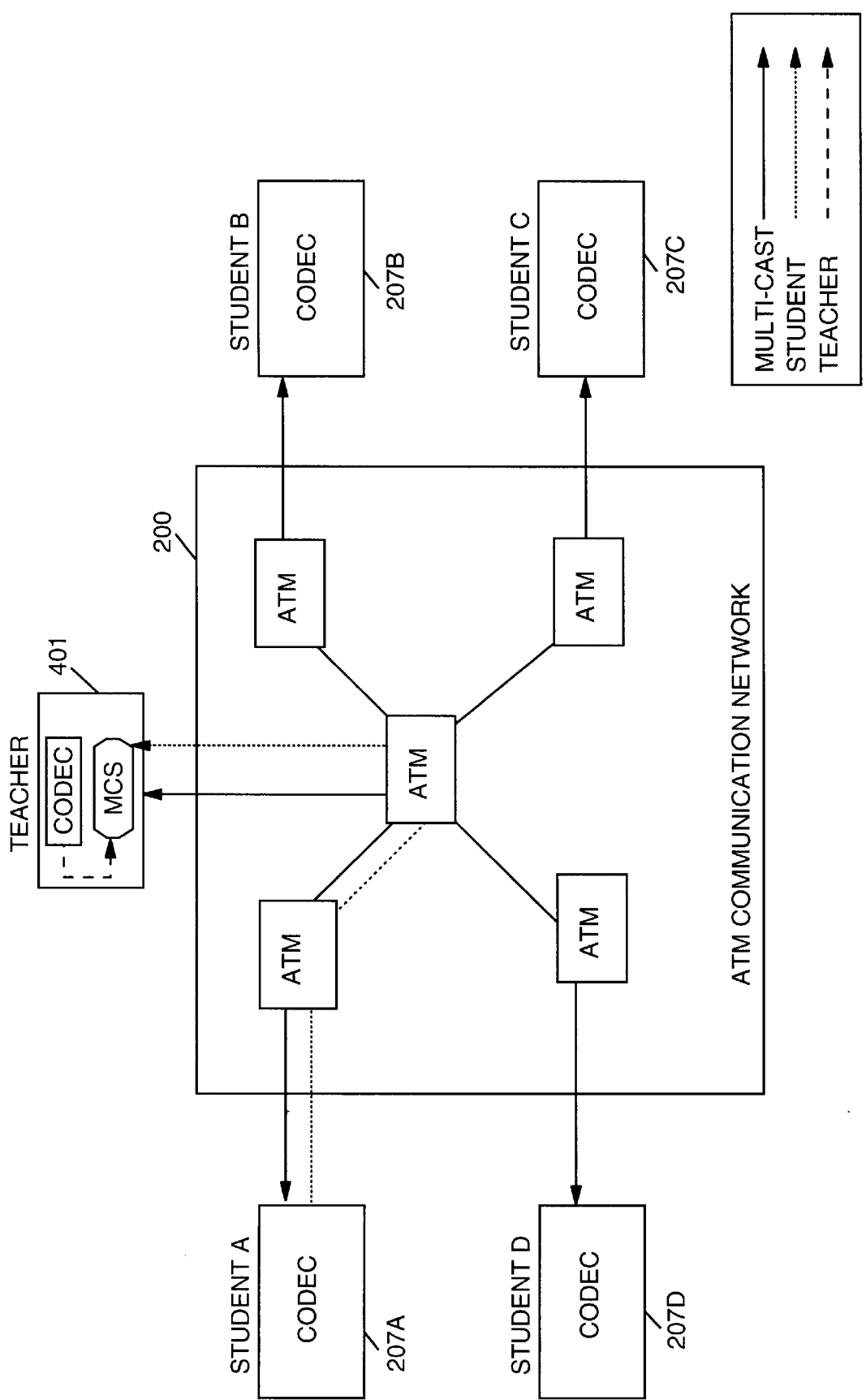
FIG. 4 depicts a distance learning system with ATM switches and with the MCS collocated at the teacher site.

FIG. 3 depicts a distance learning system using an ATM network. The multi-cast clients 307A, 307B, 307C, 307D reside in platforms at each site. The multi-cast server 301 is located in or near ATM network 311 and forms the root of the point to multi-point connection that connects all participants in a particular distance learning session. Note the coordinator logical component is physical located in the MCS in the embodiment shown in FIG. 3. Since the teacher may participate in the arbitration process, FIG. 3 also depicts the arbitrator 309 logical component collocated with the teacher Codec.

In a session with N+1 sites (one teacher site and N student sites), the MCS sets up a single point to-multi-point connection. The teacher site connects to the MCS through an ATM SVC (switch virtual circuit). The teacher is a primary multi-cast client since this AVM stream is never terminated during the session. The teacher's AVM stream is shown as a dashed line on FIG. 3. The MCS multi-casts the teacher's AVM stream over the ATM network via the point to multi-point connection. Each MC Client then presents the AVM stream to students at the MC Client site. The point to multi-point connection is illustrated as solid lines on FIG. 3.

In an ATM network, the point to multi-point connection is established by using the ATM signaling messages available in the ATM User-to-Network Interface (UNI) 3.0 and 3.1 (or later) specifications. Given ATM addresses $A_1, A_2, \ldots A_N$, the multi-cast server must follow the commands listed in Table 1 to form the point to multi-point connection. Note that non-significant parameters of the commands are omitted for brevity.

Address $A_i$. If the client does not have any existing calls with the same CR, the network will translate the ADD_PARTY to a SETUP command before sending it to the client.

5. Acknowledge SETUP Request by Client. This acknowledgment is sent back to the MCS.
6. Client accepts the call with a CONNECT. Network translates this command and sends the MCS an ADD_PARTY_ACKNOWLEDGE to indicate acceptance of ADD_PARTY command.

The following steps describe the deletion of all clients after the first from the point to multi-point connection. Steps, 7–8 are repeated for all these clients.

7. MCS asks the network to drop a party. The Client receives a RELEASE command from the network.
8. The Client agrees to the RELEASE. The Network will send a DROP_PARTY_ACKNOWLEDGE to the MCS.
9. The MCS requests the release of the virtual circuit. This will release the first client.
10. The client releases the virtual circuit. The network notifies the MCS of this release.

When a student at site A wants to talk, the multi-cast client 307A at site A signals the arbitrator 309 to request permission to speak. Note that this request could be sent over a low bandwidth link. A multi-cast client may indicate their request to speak over any type of acknowledged communi-

TABLE 1

Commands to Setup the point to multi-point connection in an ATM Network

| Step | MCS Command to Network | Network Response to MCS | Network Command to Client | Client Response to Network |
|---|---|---|---|---|
| 1 | SETUP($A_1$, CR . . .) | | SETUP($A_1$, CR . . .) | |
| 2 | | CALL_PROCEEDING (CR . . .) | | CALL_PROCEEDING(CR . . .) |
| 3 | | CONNECT(CR) | | CONNECT(CR) |
| 4 | ADD PARTY ($A_1$, CR . . .) | | SETUP($A_1$, CR . . .) | |
| 5 | | | | CALL_PROCEEDING(CR . . .) |
| 6 | | ADD_PARTY_ ACKNOWLEDGE | | CONNECT(CR) |
| 7 | DROP_PARTY (A, CR) | | RELEASE | |
| 8 | DROP_PARTY_ ACKNOWLEDGE | | | RELEASE_COMPLETE(A, CR) |
| 9 | RELEASE | | RELEASE | |
| 10 | | RELEASE_COMPLETE | | RELEASE_COMPLETE |

The following describe the actions in each step:

1. Send command to ATM network to setup the first client of the point to multi-point connection at ATM Address $A_1$, with call reference CR. This command is relayed by network to the client.
2. Acknowledge SETUP Request. This acknowledgment is sent back to the MCS.
3. Client accepts call with call reference CR. This command is sent back to the MCS by the network. At this point, the MCS may proceed with setting up other clients.

The following steps describe the addition of all clients after the first one to the multi-cast. Steps, 4–6 are repeated for all these clients.

4. Send command to ATM network to add a new client to an existing connection (identified by CR) with ATM cation channel including but not limited to TCP/IP over traditional local area networks, TCP/IP over ATM, TCP/IP over LAN Emulation over ATM, or other reliable protocols such as SNA, IPX, etc. The coordinator and arbitrator collaborate to determine whether site A should be granted permission to speak. If permission is granted the multi-cast client 307A at site A is notified and activates its AVM stream (i.e., the video signal). The multi-cast client 307A dynamically establishes a connection to the multi-cast server (see dotted line connection from student 307A to MCS 309) and starts transmitting its AVM stream. The MCS 301 switches the active channel from the selected source (i.e., the teacher's AVM stream or some other student's AVM stream) to multi-cast client 307A's connection. The teacher, primary MC client, may stop sending its associated AVM stream and/or the MCS may ignore the AVM stream flowing on that connection. After the student completes his/her question, the selected AVM stream is switched back to the teacher's AVM stream and the dynamic point-to-point link between student A 307A and the MCS 301 is terminated.

The present invention minimizes the use of communication system bandwidth by the use of a point to multi-point connection for broadcasting or multi-casting the selected AVM stream and by the use of dynamic point-to-point connections. The dynamic point-to-point connection only utilizes communication system bandwidth while the connection is needed (i.e., when the requesting client has permission to speak). The requesting MC client's AVM stream is switched into the point to multi-point connection by the MCS server. Dynamic setup of SVC calls when a student multi-cast client is granted permission to speak and the subsequent tear down of the connection after the student has finished speaking saves bandwidth in the network.

Figure 5:
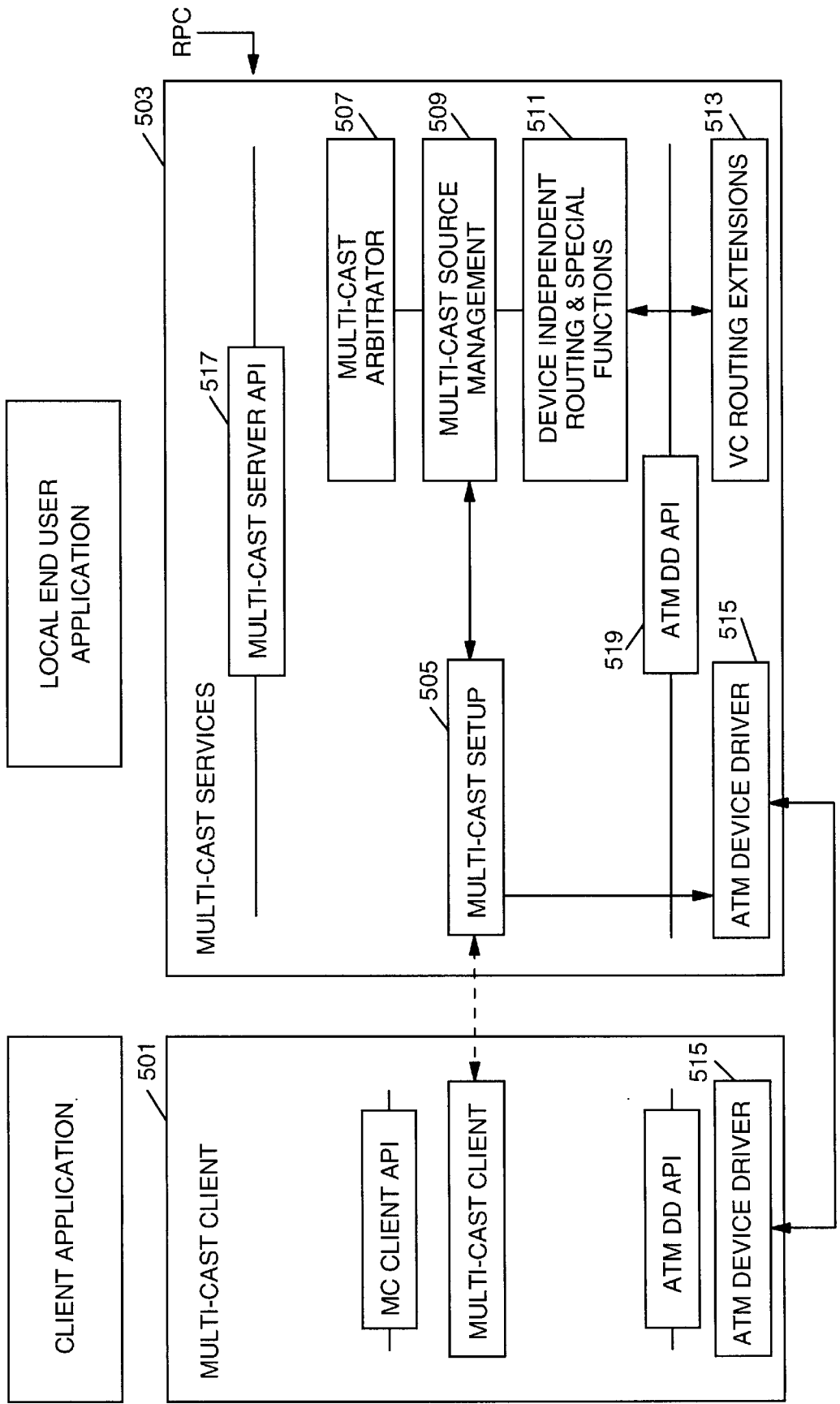
FIG. 5 depicts functional architecture of a MC client and the MC server.
Figure 6:
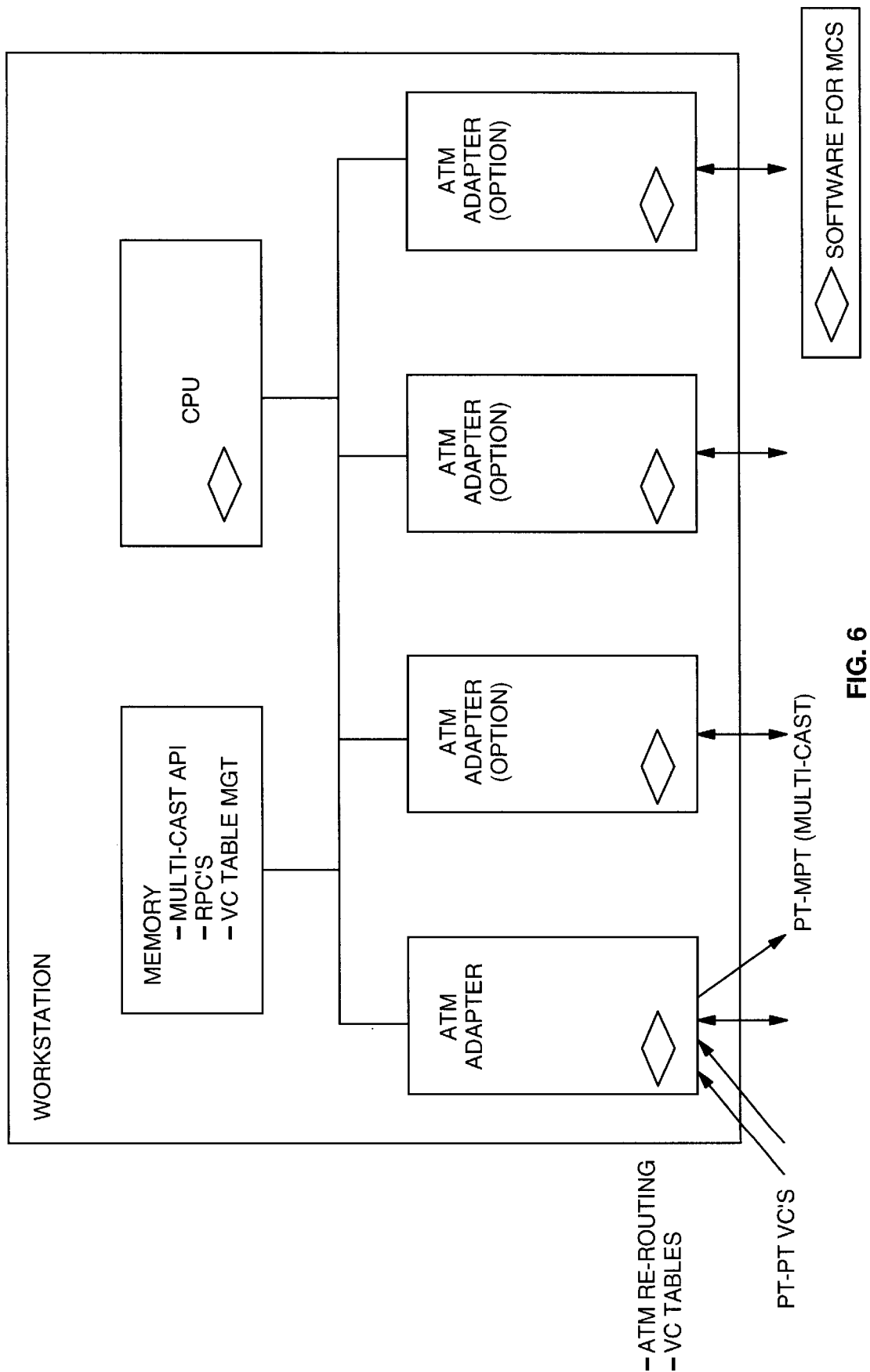
FIG. 6 depicts a Multi-Cast Server with ATM Adapters.

One embodiment of a software architecture for the multi-cast based distance learning system is shown in FIG. 5. The multi-cast server 503 provides multi-cast services that may be controlled or activated from any part of the network. These services may by available via Remote Procedure Call (RPC) or any other command activation scheme. These services are provided to other components on the communications via an Multi-Cast Server Application Programming Interface (API). The Multi-cast Server API 517 permits the distribution of the MCS throughout the communications network. The multi-cast server contains the following software components:

Multi-cast Setup 505

This component performs the coordinator functions. It is called by the session owners (which can require privileged access) to setup a point to multi-point connection with a given set of client addresses. This function provides for dynamic addition and deletion of participants into the multi-cast session by the session owner or client. Multiple point to multi-point connections may be owned by the same session owner, any participant additions or deletions may be reflected to all connections owned by the same owner. A multi-cast represents a one to many connection within a communication network. In an ATM network, the multi-cast is formed by using a point-to-multi-point call. In other networks, this may be termed differently. Since ATM and circuit switched networks are available and have the capability to setup point to multi point calls, the preferred embodiment of the present invention uses the capabilities in these network's signaling mechanisms to describe the setup of the multi-cast. Setup of a multi-cast was described above. The MCS may setup multiple point to multi-point connections to serve multiple sessions.

Multi-cast source arbitrator 507

This component performs the arbitrator functions as described above.

Multi-cast source management 509

This component is called by the owner of the multi-cast to select the AVM source into the point to multi-point connection (i.e., the selected AVM stream for multi-casting). This source of data is received from the network and routed back into network via the point to multi-point connection. This is the routing function provided by the MCS. The owner of the multi-cast session determines which AVM stream is provided to the clients of the multi-cast. This source must be fed into the point to multi-point connection originating from the multi-cast server.

The source management software keeps a source management table, see FIG. 8A, that contains references to the routing table. The source management table keeps track of each multi-cast session. The primary elements of the table are the owner station, a reference into the routing table, the current MC client source being multi-cast and the clients of the multi-cast session. Whenever a new source is selected by the owner of the multi-cast session, the source manager changes the routing table entries to reflect the (VPI, VCI) of the new source. This source manager learns these parameters when the source first establishes a circuit to the MCS.

If the MCS switches frequently between multiple sources, it will be beneficial to keep both entries in the routing table and simply activate only one of the multiple sources. This is illustrated in the FIG. 8B with rows 1 and 3 having the same outgoing virtual circuit and different incoming virtual circuits.

The MCS Source management function may perform enhanced switching. In enhanced switching, when the AVM source is switched, the switching occurs at a time that produces the fewest artifacts on the viewing clients. For example, compressed video consists of data packets that contain data that are used to reconstruct a full screen image. If the AVM is switched halfway through video frame, the viewers will see a brief artifact on their screen. This can be eliminated by permitting switching only on screen or frame boundaries.

Device Independent Routing and Special Functions 511

This component routes data into the point to multi-point connection in implementations where hardware routing on ATM adapters is not available. The routing function is best performed in hardware with a routing table. The table, as shown in FIG. 8B contains a list of routed circuits and their corresponding outgoing labels. Assuming an ATM network environment, the sources are represented by their virtual circuit (VC) labels, in the form of (VPI, VCI). This is the format used in the ATM cell headers. In other cases, certain applications may require multi-casting and source switching to be aware of the contents of the data being switched. For example, in video applications, certain video decoders may require the switching of video sources at frame boundaries. This module provides such special functions, if required.

Virtual Circuit Routing Extensions 513

These are extensions to the standard device driver of an ATM adapter. These extensions provide support for hardware routing of ATM data within the ATM adapter itself. Such a function, if available, reduces the processing required by the host platform of the multi-cast server. The source management and routing tables define the incoming and outgoing virtual circuits that form a multi-point video conferencing session. The actual work of sending the appropriate data to the appropriate multi-point virtual circuit is accomplished through virtual circuit rerouting. VC re-routing is a derivative of the label-swap routing concept used in ATM switches. The basic concept is that an incoming data packet (ATM cell) must be examined to determine the source of the data. For ATM, the cell-header must be decoded to lookup the VCI and VPI of the cell. Afterwards, the same VCI, VPI must be used to index into the routing table to determine the corresponding outgoing virtual circuit, identified by its own (VCI, VPI) tuple. Finally, the VCI, VPI of the incoming cell must be changed (this is called label swapping in ATM switch descriptions) to the (VCI, VPI) of the outgoing VC.

Note that although an ATM switch may perform the same cell routing functions, its purpose is entirely to route cells between different ports on the switch. In the case of the MCS, the purpose of the re-routing is to change the source of the data being transmitted on the outgoing, multi-point VC.

ATM Device Driver 515

This component provides access to ATM data and signaling. It provides ATM UNI 3.0 or 3.1 signaling to setup and tear down point to multi-point and point to point calls and data transfers at the AAL layer. Currently the ATM Forum, which is the main governing body of ATM specifications has not yet produced a standard document for accessing ATM related services in ATM end-points. However, the Forum has issued a signaling and interface specification, User-to-Network Interface, that describes the services for signaling and management. Each manufacturer is at a liberty to implement an interface that provides these standardized services. This is what is termed as the "standard ATM Adapter Device Driver." The standard ATM Adapter Device Driver provides the following functions to applications in an ATM-aware platform. This platform is called an ATM end-point. Signaling: These functions allow ATM-aware applications to setup and tear-down virtual circuits over an ATM network. Data Transfer: These functions allow ATM-aware applications to transfer data using one of ATM's Adaptation Layers (AAL) such as AAL1 or AAL5. Network Management: The Network Management functions (Interim Local Management Interface-ILMI) allow the ATM end-point to support network management. The ability to route one ATM virtual circuit into another is not a standard service defined within the UNI document. Therefore, this routing function must be added to existing device drivers.

The multi-cast server facilities are accessed through the multi-cast server API 517. This API may be called by applications local to the workstation or may be called through remote procedure calls. The physical connection to the communications network is accessed by the ATM DD API 519 which provides access to the ATM Device driver 515 and VC Routing Extensions 513.

Figure 7:
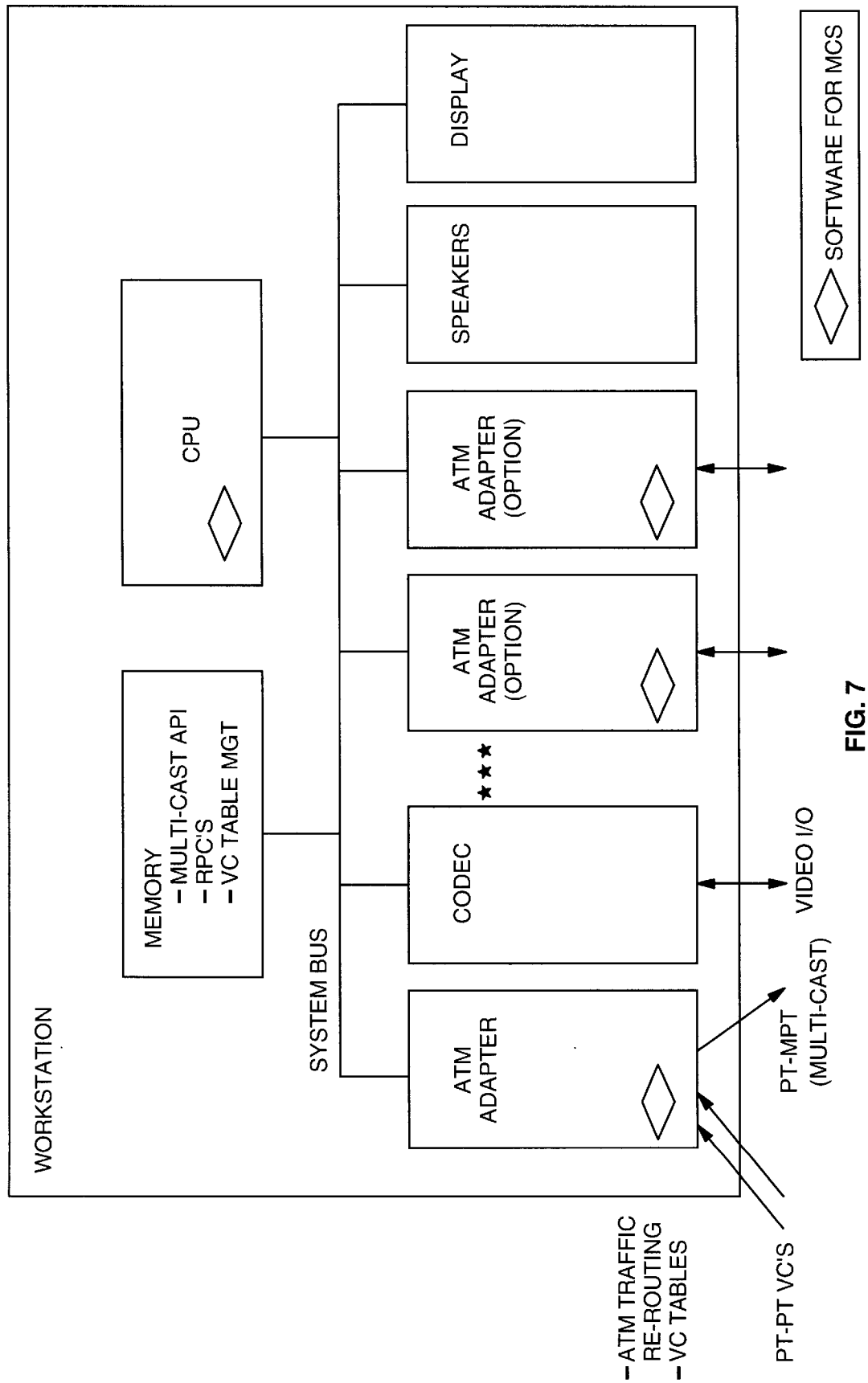
FIG. 7 depicts a Multi-Cast Server with integrated Codec.

The multi-cast client permits access to a subset of the multi-cast services. Specifically, services for adding and deleting participants are provided by the multi-cast client 501. The multi-cast client communicates with the multi-cast server via a reliable protocol over ATM (for example TCP/IP over ATM) or through another network. The present invention does not require that the same network be used for the point-to-point connections and point to multi-point connection. The preferred architecture for the MCS system is illustrated in FIG. 7.

Multi-cast Client

The multi-cast client resides at all participant sites such as student or teacher sites in a distance learning session. The client may execute on a dedicated workstation of PC platform, or may be combined with a video encoder/decoder (codec) to execute as a combined codec and multi-cast client.

Figure 11:
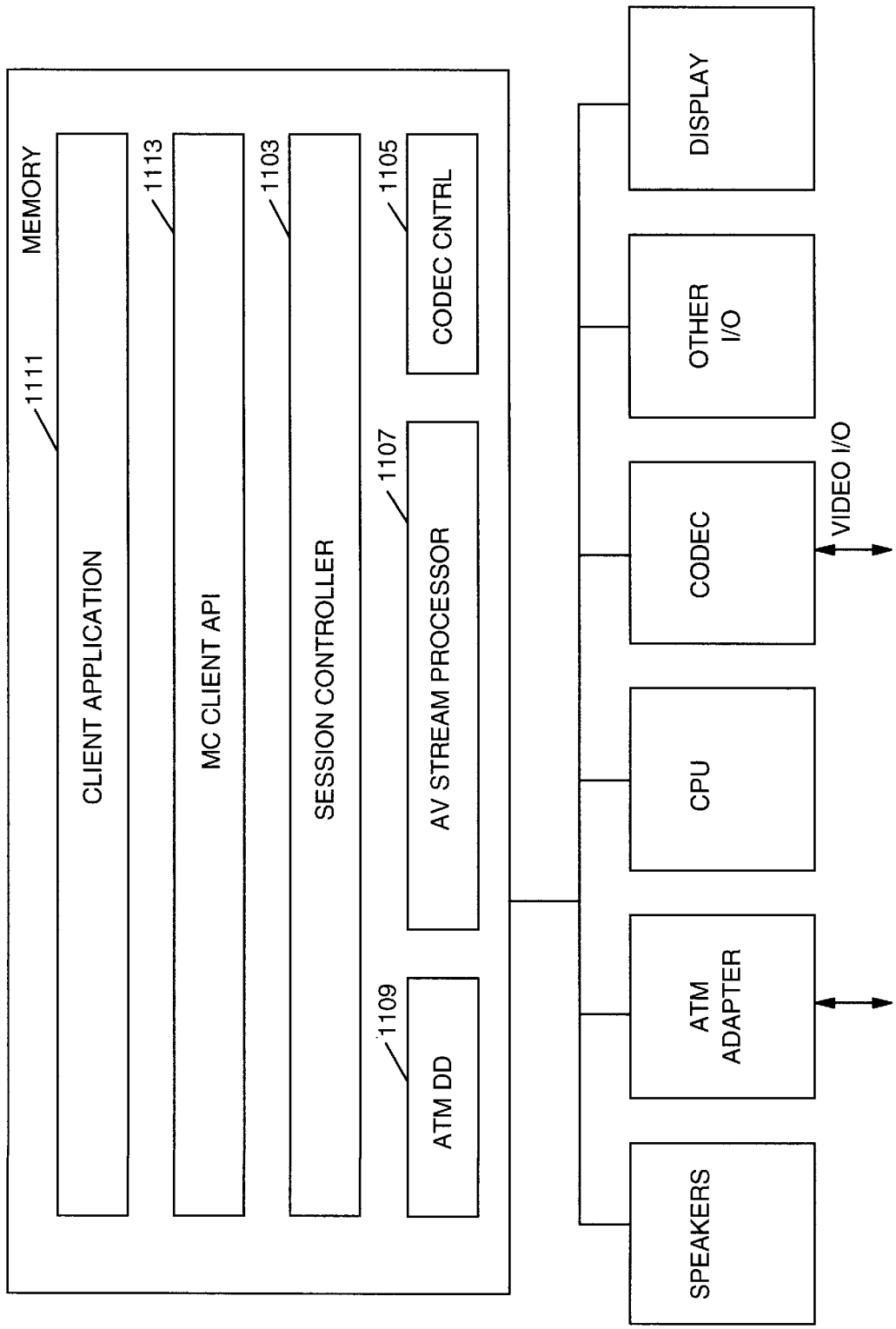
FIG. 11 depicts a MC Client workstation.

The basic functions of the preferred multi-cast client are described below (See FIG. 11). In the preferred embodiment the client software is defined together with software to manage the codec. The multi-cast client may contain the following components: Session Controller 1103, Codec Controller 1105, AVM Stream Processing 1107, ATM Device Driver 1109 and Client Application 1111.

Session Controller 1103

The session control function is the "brains" of the multi-cast client. The session control module receives join/drop commands from the coordinator over a reliable network connection such as (but not limited to ) TCP/IP over ATM, or sends join/drop requests to the coordinator that it receives from the user of the multi-cast client. Once in session, the session controller will first send commands to the codec controller 1105 to setup the encoder/decoder to start encoding and decoding audio and video. In the preferred implementation, the incoming AVM stream (the stream originating from the MCS) will be carried over a point to multi-point connection on an ATM network setup by the MCS. The MC Client will receive an indication of this connection (as described in Table 1). In non-ATM networks, similar indications will be available from the network adapter driver.

After the codec controls are setup and the indication of the connection is received, the session controller 1103 will wait for one or more of the following events: speak requests from the user of the MC Client, "show" requests from the MC Server or Coordinator, drop requests or commands from the user of the client and the coordinator, respectively.

If the session controller 1103 receives a speak request (i.e., input by a student), it will send the request to the arbitrator. The arbitrator will make a determination and respond to the MC Client, while informing the MC Server about the decision. If the decision is affirmative, the Session controller will command the ATM device driver to setup a pt-pt connection to the MC server. It will also command the AVM Stream Processor to take the encoded AVM from the Codec to send it to the ATM Connection through the ATM device driver. If the decision from the arbitrator is negative, the session controller will continue to wait for other events.

Note that the preferred implementation of the Session Controller utilizes switched virtual circuit services available in ATM networks. In ATM networks with dynamic PVC services, the activation of the PVCs can be performed by an external controller commanded by the coordinator, the MC Server, arbitrator or the MC Client. In non-ATM networks, connections may be setup through a variety of means.

After the speaking request is granted, the MC Server will terminate the speaking session after a certain amount of time or activity that is user configurable. To terminate the speak connection, the MC Client will first ask the AVM Stream processor to terminate sending the AVM stream to the ATM adapter. It will then ask the ATM adapter to disconnect from the network.

If the Session controller receives a drop command from the coordinator or the user, it will terminate all codec activities through a command to the Codec Controller. It will then release any possible point to point connections to the MCS. The connection from the MCS to the MC Client will be released by the MCS itself in the preferred implementation, although it is also possible for the MC Client to release the connection.

Codec Controller 1105

In the preferred embodiment, the audio/video encoder/decoder resides on the same workstation as the MC Client. The codec controller activates, deactivates and changes all relevant parameters for encoding audio and video signals provided by external devices into a format suitable for transmission over a network. It also activates, deactivates and changes parameters relevant for decoding audio and video signals transmitted to the client over the network, into a format suitable for display on a display devices such as TV monitors.

ATM Stream Processor 1107

In the preferred embodiment, the AVM stream produced by the codec can be directed to a network through the AVM Stream processor. The Stream processor sets up and manages hardware or software channels to send the encoded audio and video signals to the appropriate networking interface. In the preferred embodiment, this networking interface is the ATM network adapter (ATM NIC). The stream processor also sets up and manages the hardware or software channels to receive encoded audio and video data from the networking interface and to send to the appropriate decoding unit.

ATM device driver 1109

The ATM device driver was previously described in the MCS.

Client Application 1111

The Client application utilizes the services of the multi-cast client API to join or drop a conference, request to speak or drop a speak request, other functions such as codec and network status checking. The client application can take any form and does not necessarily have to executed in the same platform as the MC Client. The Client Application may make use of the MC Client workstation via the MC Client API 1113.

The MC client workstation will also have the ability to present received AVM streams. Thus, some display device such as a monitor or TV and speakers are part of the MC Client workstation. The decoded AVM stream is presented to the student or student at the MC client site.

Multi-cast Arbitrator

The multi-cast arbitrator may execute on any platform in the network. However, in most cases, the teacher will manually grant permission to the student site asking questions. Therefore, the teacher site may be the best location for the multi-cast arbitrator.

ATM Switch Based Multi-Cast Server

The multi-cast server may be based on an ATM switch. Traditionally, ATM switches do not terminate SVC calls. However, as indicated in published technical disclosures [C. M. Aras, J. Bellinghausen, A. Cretegny, H. Huot, ATM Signaling Software reuse Through SAP Mapping, IBM Technical Disclosure Bulletin], ATM Q.2931 signaling and ATM data flows may be terminated within ATM switches. In the same spirit, ATM SVC point-to-multi-point calls may be originated from an agent in an ATM switch.

The general function that re-routes ATM traffic to connect one of many point-to-point ATM connections into a point-to-multi-point ATM connection may be provided in an ATM switch. The MCS in one embodiment provides an ATM adapter function that performs cell re-routing to connect one of many point-to-point connections into a point-to-multi-point connection. Location of the multi-cast server on ATM switch with set-management functions also provides better bandwidth utilization.

In order to implement a multi-cast server on an ATM switch, the switch software must provide the following functions: ATM call termination, ATM call origination, Multi-cast source management interface through a connection oriented, reliable protocol, ATM connection routing between point-to-point calls and a point-to-multi-point call.

Standalone Multi-cast Server

A multi-cast server may be implemented on a workstation with ATM adapters. In a workstation implementation, if the VC routing extensions are available on an ATM adapter, routing data from a point-to-point to an point-to-multi-point connection will be performed in the adapter itself (See FIG. 7). In this case, the multi-cast server on a workstation performs the following functions in the ATM Adapter: ATM cell re-routing (for multi-cast) or forwarding (for local traffic) based on VC tables and VC table lookup and updates. Other multi-cast server functions are executed on a separate CPU.

Figure 9:
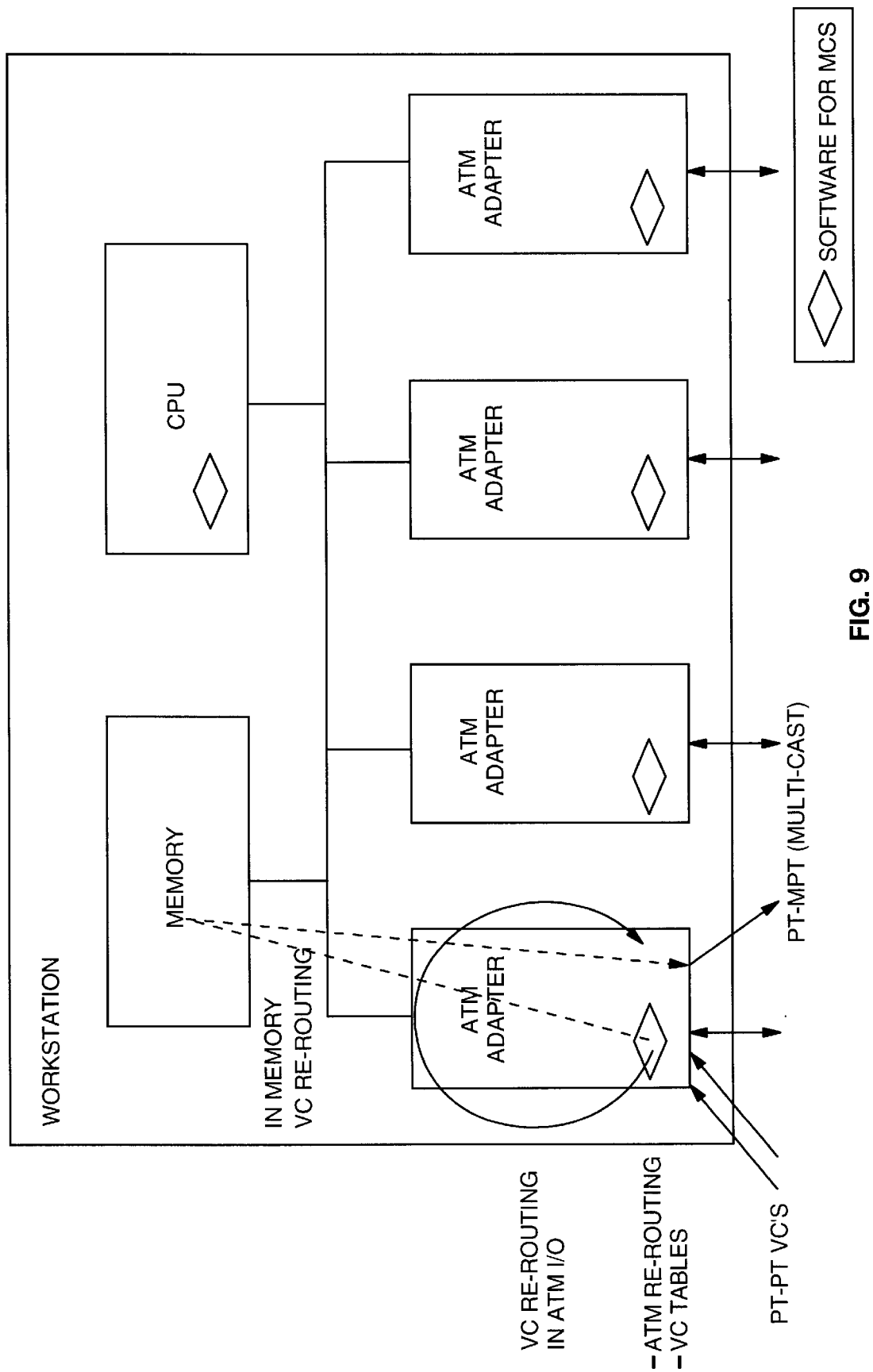
FIG. 9 depicts a MCS with memory and adapter VC routing.
Figure 10:
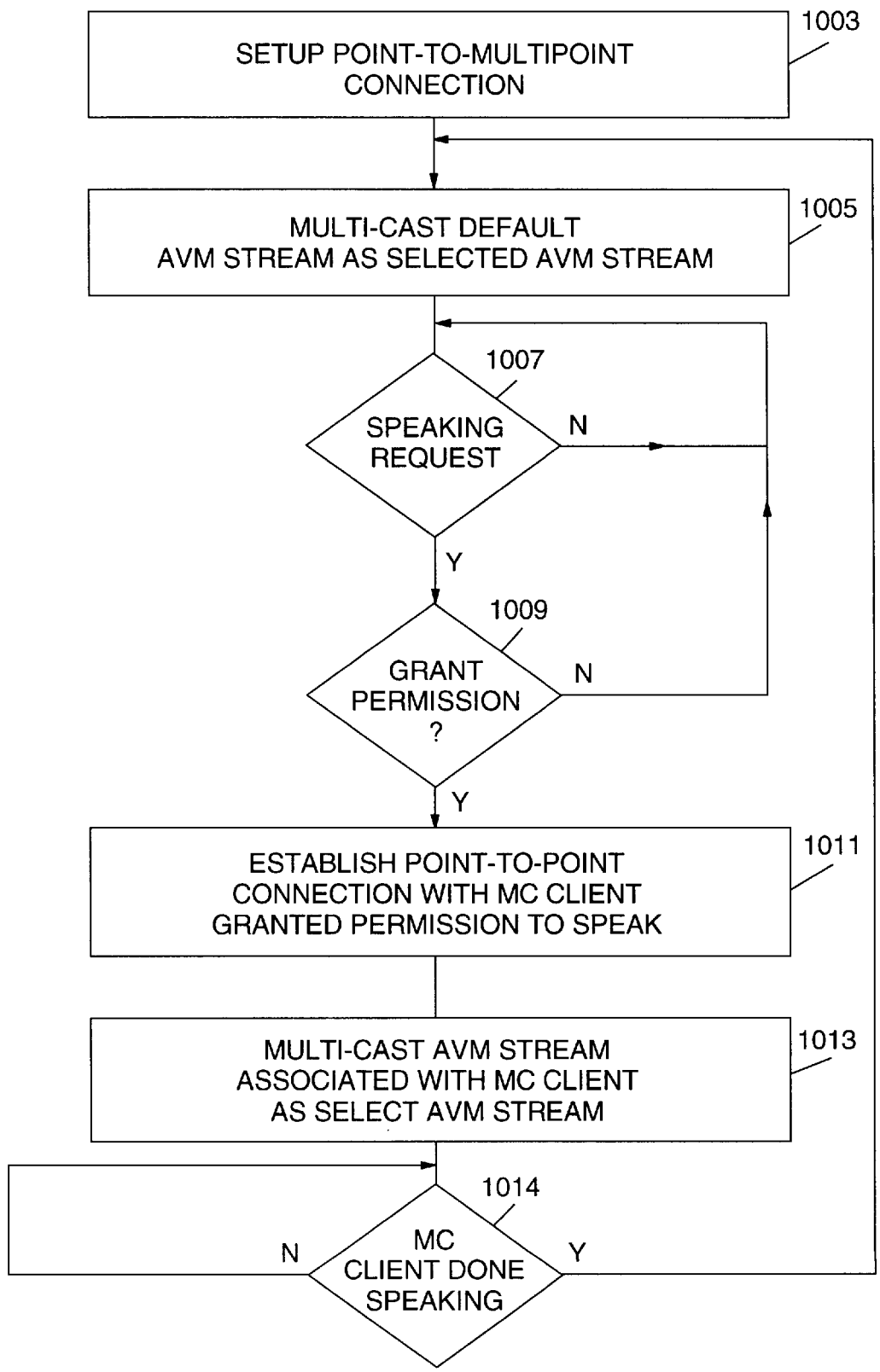
FIG. 10 depicts the method of a distance learning system.

A multi-cast server (MCS) may be implemented as a standalone platform. As a standalone device, the MCS is a computer system with a general purpose central processing unit, memory, high-speed bus, I/O adapters for ATM and, if required, for local area networking (See FIG. 9). The standalone multi-cast server is connected to an ATM switch supporting the ATM user-to-network interface.

In a standalone platform, the MCS will perform
1. Multi-cast source management (as described previously)
2. Multi-cast setup and tear/down (as described previously)
3. Virtual circuit routing (as described previously)

The first two functions are integrated into software resident in memory and executing on the processor. The virtual circuit routing can be implemented (See FIG. 9) in one of two possible ways:

Cell-routing in ATM I/O

ATM cells arriving into an I/O adapter are normally examined to determine the final recipient of the cell within the computer system. It is also possible to perform a label swap on the data by replacing the current VCI, VPI of the data with the VCI/VPI of an outgoing connection that forms the root of a multi-point connection, as described in the virtual re-routing section. The label-swapping operation requires the replacement of only three bytes of information thus it can be implemented in hardware or microcode without much difficulty or expense.

Figure 8:
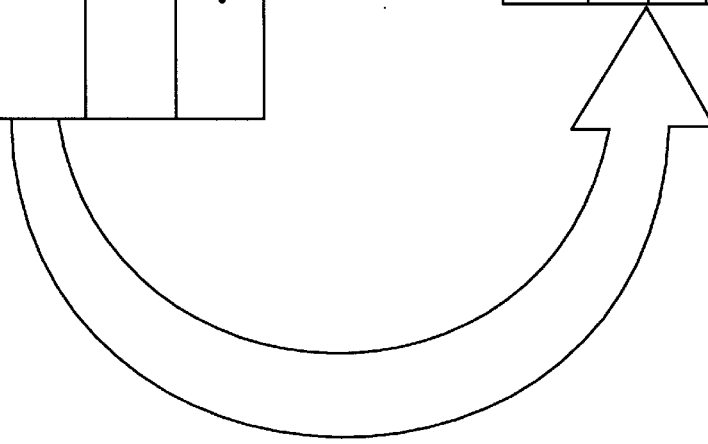
FIG. 8A depicts the Source Management table.
FIG. 8B depicts the Routing table.

When implemented in an ATM I/O adapter, the routing table previously described and shown in FIG. 8, must be available to the routing hardware.

VC re-routing in Memory

In an ATM network, data is sent over cells. To provide different types of quality of service, ATM provides adaptation layers that adapt the original form of the data into a specific format that can be split over multiple ATM cells. For example, a large data block are placed in related cells and the group of cells that carry related data are identified with a cyclic redundancy check when AAL type 5 is used.

If special purpose hardware for label-swapping is not available to implement virtual circuit re-routing, the same function can be implemented using standard ATM adapter services. In order to send data on an ATM adapter, most adapters provide function calls as listed in Table 1 to send and receive data. The functions listed in this table allow software to transmit and receive an AAL5 (ATM adaptation Layer 5) protocol data unit (PDU). Similar functions may be available to transmit PDU's of different AAL types including but not limited to AAL0 (which is the NULL AAL), AAL1, AAL2, AAL3/4 and other AAL types that have not been developed at this time.

TABLE 2

ATM Data Transmit/Receive Functions

| Function | Purpose |
| --- | --- |
| AAL5_DATA_TRANSMIT(VC_Reference,Data_Pointer) | Transmits the data, referenced by the Data_Pointer to the virtual circuit identified by VC_Reference |
| AAL5_DATA_RECEIVE(VC_Reference,Data_Pointer) | When called, waits until data is received from the Virtual Circuit identified by VC_Reference and placed in buffer referenced by Data_Pointer. |

The AAL5_DATA_RECEIVE function provides the data received from the VC only (the cell headers with the VCI, VPI are removed beforehand). Thus, even though it is less efficient, VC re-routing, can be implemented by utilizing these functions one after another. An example is given below:

Given two incoming VCs with VC1=VCI, VPI: 45, 100 and VC2=63,102. The outgoing VC is VC3=74,95. To send VC1 into the outgoing VC, VC3, the following functions will be executed repeatedly until the VC routing function is terminated:

```
While (ROUTING_ACTIVE)
{
AAL5_DATA_RECEIVE(VC_Ref1, Ptr)
AAL5_DATA_TRANSMIT(VC_Ref3,Ptr)
}
```

When the VC is changed to route VC2 into VC3, the function parameters will be modified and the loop will change to the following

```
While (ROUTING_ACTIVE)
{
AAL5_DATA_RECEIVE(VC_Ref2, Ptr)
AAL5_DATA_TRANSMIT(VC_Ref3,Ptr)
}
```

Combined Codec and Multi-cast Server

If a multi-cast server is used to transmit audio-visual material streams produced by a video codec, efficiencies of bandwidth can be gained by combining a codec and the multi-cast server functions, as described for the standalone MC server. The main benefit of this implementation is due to a more efficient point to multi-point connection if the connection is originated from the predominant speaker of the multi-person conference. In the case of distance learning, this is most likely to be the teacher.

In the combined system, the virtual circuit connection from the teacher location, as it would be in the standalone implementation, is replaced by a connection internal to the combined system. Since the predominant speaker is at the root of the multi-cast, there will not be a need to transmit the AVM of the predominant speaker on the network before it is re-routed into the point to multi-point connection. In the typical case, the teacher speaks 90% of the time. Thus, 90% of the time, there will not be a point-to-point connection destined to the multi-cast server. Instead, the data will be transferred internal to the system and then transmitted to the ATM network.

Figure 12:
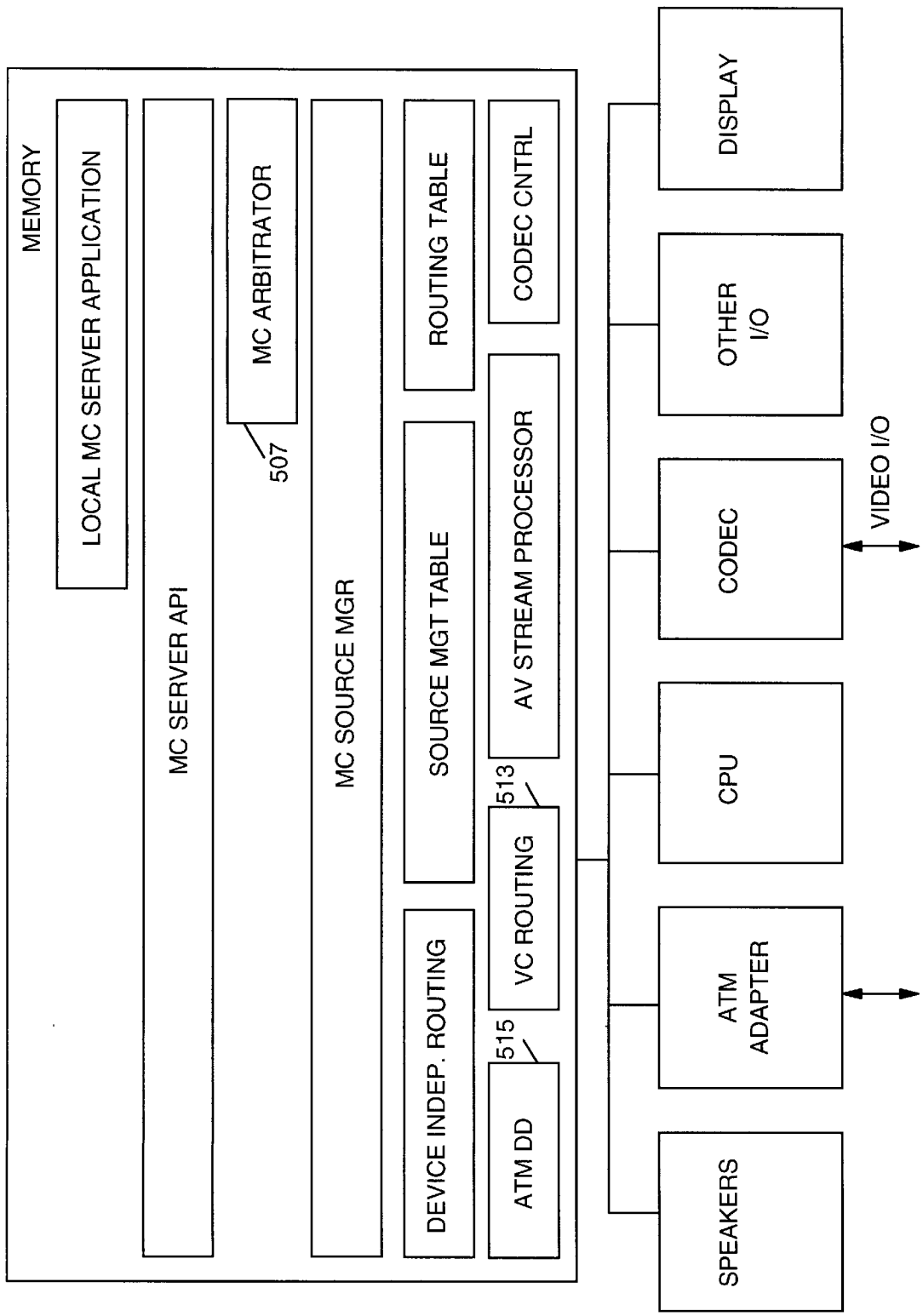
FIG. 12 depicts a MCS workstation.

The MCS may be combined with a video Codec on the same hardware platform (See FIG. 7 and FIG. 12). This allows for any participant site to act as a multi-cast server. Furthermore, combining the Codec and multi-cast server affords other advantages such as: elimination of hardware and additional switch ports that are required with separate platforms. Also more optimal multi-casting can be provided and a reduction in network utilization since the AVM stream acting as the default source of the multi-cast does not have to be transported to the dedicated multi-cast server (i.e. no need for point-to-point link between the MCS and the primary MC). In a distance learning application faster switching is provided between AVM stream sources because the primary AVM stream is collocated with the MCS. In terms of network optimization, the teacher's video Codec is the best location for the source of the point to multi-point connection, since most of the time, the teacher's video will be shown to the students.

By combining the multi-cast server and Codec into the same workstation hardware costs are reduced and communication system bandwidth is reduced. FIG. 7 illustrates a distance learning system with a combined Codec/MCS. FIG. 12 shows a more detailed view of an MCS workstation with a codec.

Other features may also be present on the MCS to provide advance facilities. A video combiner may be utilized to combine the primary MC AVM stream with a MC client granted permission to speak. Thus, participants could see a side by side view of the teacher and the student. Also a picture in picture AVM stream could be created. Creating a combined AVM stream from two or more streams requires some additional hardware on the MCS. Thus, for ATM this may entail decompressing, synchronizing and combining. The selected AVM stream is the newly combined stream which is multi-cast as the selected AVM stream. Thus, no additional communication bandwidth is required and all additional hardware is centralized at the MCS.

Note that the present invention has been described with respect to a distance learning system, however the present invention may be utilized to in any video-conferencing application using the primary MC is the default AVM source and the MC clients as participants.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A video-conferencing system, comprising
   a communication network supporting multi-casting of an AVM stream from a multi-cast ("MC") server to a plurality of MC clients and a primary MC client participating in a video-conferencing session over point-to-multi-point connections,
   wherein the first plurality of MC clients are each participating in a first session, each MC client capable of receiving a selected AVM stream from the communication network and transmitting an associated AVM stream onto the communication network;
   wherein the primary MC client is participating in the first session, the primary MC client capable of receiving the selected AVM stream from the communications network and transmitting a default AVM stream onto the communications network from the primary MC client to the MC server over a point-to-point connection, and
   wherein the MC server provides the selected AVM stream to the first plurality of MC clients and the primary MC client via a first point-to-multi-point connection on said communications network, the MC server receiving the default AVM stream from the primary MC client and multi-casting the default AVM stream over the point-to-multi-point connections, said MC server switching between multi-casting the default AVM stream and a client AVM stream associated with any one of the MC clients granted permission to speak after the one of the MC clients has requested permission to speak wherein the client AVM stream is provided to the MC server via a dynamically created point-to-point link existing only for the duration of the client AVM transmission wherein the default AVM stream is maintained between the primary MC client and the MC server during the time the client AVM stream is transmitted to the MC server and wherein the dynamically created point-to-point link is torn down when the one of the MC clients is finished speaking and wherein the default AVM stream is then again multi-casted over the point-to-multi-point connection between the MC server and the plurality of the MC clients and the primary MC client.

2. The system of claim 1 wherein the MC server and primary MC are collocated.

3. The system of claim 1 wherein the MC server combines the client AVM stream with the default AVM stream to form the selected AVM stream during the client AVM transmission.

4. The system of claim 1 wherein the MC server only permits establishment of one client connection at a time.

5. The system of claim 1 further comprising:
a coordinator for joining and dropping MC clients from the first session and causing the MC server to add or delete MC clients from the first point-to-multi-point connection.

6. The system of claim 1 wherein the communications network is an ATM communications network.

7. The system of claim 6 wherein the multi-cast server performs switching by virtual circuit re-routing.

8. The system of claim 6 wherein the plurality of MC Clients, the primary MC client and the multi-cast server are each equipped with ATM adapter for receiving and transmitting AVM streams.

9. The system of claim 6 wherein the multi-cast server performs switching by virtual circuit re-routing.

10. The system of claim 8 wherein the multi-cast server performs switching by virtual circuit re-routing on the ATM adapter.

11. The system of claim 6 wherein the first point to multi-point connection is established using a multi-cast tree.

12. In a video-conferencing system, a method comprising the steps of:
establishing a point to multi-point connection, the point to multi-point connection for providing from an MC server and AVM stream to a plurality of MC clients and a primary MC client participating in a video-conferencing session, sending a default AVM stream over a point-to-point connection from the primary MC client to the MC server, multi-casting the default AVM stream over the point to multi-point connection;

requesting permission to speak by a first MC client;

granting the first MC client permission to speak;

establishing a first point-to-point connection between the first MC client and the MC server;

sending the AVM stream associated with the first MC client over the first point to point connection from the first MC client to the MC server while maintaining the provision of the default AVM stream from the primary MC client to the MC server;

multi-casting the AVM stream associated with the first MC client over the point to multi-point connection, tearing down the first point-to-point connection when the first MC client is finishing speaking; and again multi-casting the default AVM stream, received from the primary MC client, over the point to multi-point connection between the MC server and the plurality of MC clients and the primary MC client.

13. The method of claim 12 further comprising the steps of repeating the requesting, granting, establishing, multi-casting and tearing down steps for other MC clients.

14. The method of claim 13 further comprising the step of:
joining one or more MC clients to the multi-cast tree.

15. The method of claim 13 further comprising the step of:
dropping one or more MC clients from the multi-cast tree.

16. The method of claim 13 further comprising the step of:
presenting the multi-cast AVM stream.

17. The system of claim 1, wherein the AVM streams are transmitted in real-time to provide a real-time and continuous audio and visual output to the clients.

18. The method of claim 12, wherein the multi-casting steps transmit the AVM streams in real-time over the point to multi-point connection.

19. The system of claim 1, wherein the default AVM stream and the client AVM stream are concurrently multi-casted over the point to multi-point connection.

20. The method of claim 12, wherein the default AVM stream and the client AVM stream are concurrently multi-casted over the point to multi-point connection.

21. The system of claim 1, further comprising a speaker and a display device coupled to each of the primary MC client and the plurality of MC clients, wherein the speakers and the display devices output the received AVM streams.

22. The method of claim 12, wherein each of the MC clients includes a speaker and a display device coupled thereto for outputting the received AVM streams.

23. The method of claim 13, wherein the multi-cast server and the primary MC client do not move to other data processing systems within the video-conferencing system as each of the other MC clients are given permission to speak.

24. The method of claim 1, wherein the primary MC client and the multi-cast server remain established at their respective data processing systems within the communications network even as different MC clients are granted permission to speak.

* * * * *